United States Patent [19]
Bowen et al.

[11] Patent Number: 5,128,798
[45] Date of Patent: Jul. 7, 1992

[54] ADDRESSABLE WEDGE ETALON FILTER

[75] Inventors: Donald F. Bowen, Stamford, Conn.; Pierre A. Humblet, Cambridge, Mass.; Franklin F. Tong, Stamford, Conn.

[73] Assignee: International Business Machines Corporation, Armonk, N.Y.

[21] Appl. No.: 652,839

[22] Filed: Feb. 7, 1991

[51] Int. Cl.$^5$ .......................... G02F 1/03; G02F 1/33; G02B 26/08; G01B 9/02

[52] U.S. Cl. .................................. 359/260; 359/298; 359/308; 356/352

[58] Field of Search ............... 350/353, 355, 356, 358, 350/311; 356/352; 359/305, 308, 298, 260

[56] References Cited

U.S. PATENT DOCUMENTS

| | | | |
|---|---|---|---|
| 3,034,398 | 5/1962 | Barnes et al. | 88/14 |
| 3,055,258 | 9/1962 | Huruitz | 88/14 |
| 3,373,651 | 3/1968 | Mack et al. | 88/14 |
| 3,907,430 | 9/1975 | Mann | 356/100 |
| 3,914,055 | 10/1975 | Wolga et al. | 356/75 |
| 3,984,190 | 10/1976 | Barrett et al. | 356/75 |
| 3,992,101 | 11/1976 | Dapper et al. | 356/83 |
| 4,076,422 | 2/1978 | Kohno | 356/106 |
| 4,081,760 | 3/1978 | Berg | 331/94.5 |
| 4,149,118 | 4/1979 | Winterling et al. | 318/640 |
| 4,170,416 | 10/1979 | Fencil | 356/346 |
| 4,204,771 | 5/1980 | Shull et al. | 356/352 |
| 4,225,236 | 9/1980 | Sandercock | 356/346 |
| 4,241,997 | 12/1980 | Chraplyvy | 356/309 |
| 4,324,475 | 4/1982 | Purdie | 356/352 |
| 4,487,478 | 12/1984 | Jackson | 350/622 |
| 4,533,247 | 8/1985 | Epworth | 356/345 |
| 4,600,307 | 7/1986 | Krohn et al. | 356/346 |
| 4,673,953 | 6/1987 | Hecht | 350/358 |
| 4,786,132 | 11/1988 | Gordon | 350/96 |
| 4,815,855 | 3/1989 | Dixon | 356/358 |
| 4,850,709 | 7/1989 | Ban et al. | 356/352 |
| 4,861,136 | 8/1989 | Stone et al. | 350/96.3 |
| 4,896,948 | 1/1990 | Dono et al. | 350/355 |
| 4,900,113 | 2/1990 | Hatori | 350/96 |
| 4,945,531 | 7/1990 | Suzuki | 370/3 |

FOREIGN PATENT DOCUMENTS

| | | |
|---|---|---|
| 61-30725 | 2/1986 | Japan . |
| 637768 | 12/1978 | U.S.S.R. . |
| 1073565 | 2/1984 | U.S.S.R. . |
| 2109122 | 5/1983 | United Kingdom . |

OTHER PUBLICATIONS

"Fast-Scanning Far-Infrared Fabry-Perot Interferometer" Komm et al., Applied Optics, vol. 14, No. 2, Feb. 1975.

"A Scanning Fabry-Perot Interferometer and its Application to Research", Kohno et al., J. Mech. Eng. Lab (Japan) vol. 29, No. 5, Sep., 1975.

"Mechanism For Adjusting Fabry-Perot Interferometers", Sov. J. Opt. Technol., 47(2) U.S.A. 356-352, Feb. 1980.

*Primary Examiner*—Eugene R. Laroche
*Assistant Examiner*—Evelyn A. Lester
*Attorney, Agent, or Firm*—Ratner & Prestia

[57] ABSTRACT

Apparatus is described for achieving wavelength selection. Furthermore, the apparatus exhibits very high wavelength resolution, stable operation and rapid returning. A bundle of multi-wavelength light, entering the device, is acoustooptically deflected. This is done by driving two orthogonal acoustic transducrs of the deflector with two suitable frequencies fx and fy. The light so deflected passes first through a wedge etalon having a taper along the X-axis and then through a second wedge etalon having a taper along the Y-axis. The pair of wedges forms two, single-cavity etalons. Depending on the choice of fx and fy, any wavelength within the wavelength range covered by the two, single-cavity etalons can be selected rapidly and accurately.

12 Claims, 3 Drawing Sheets

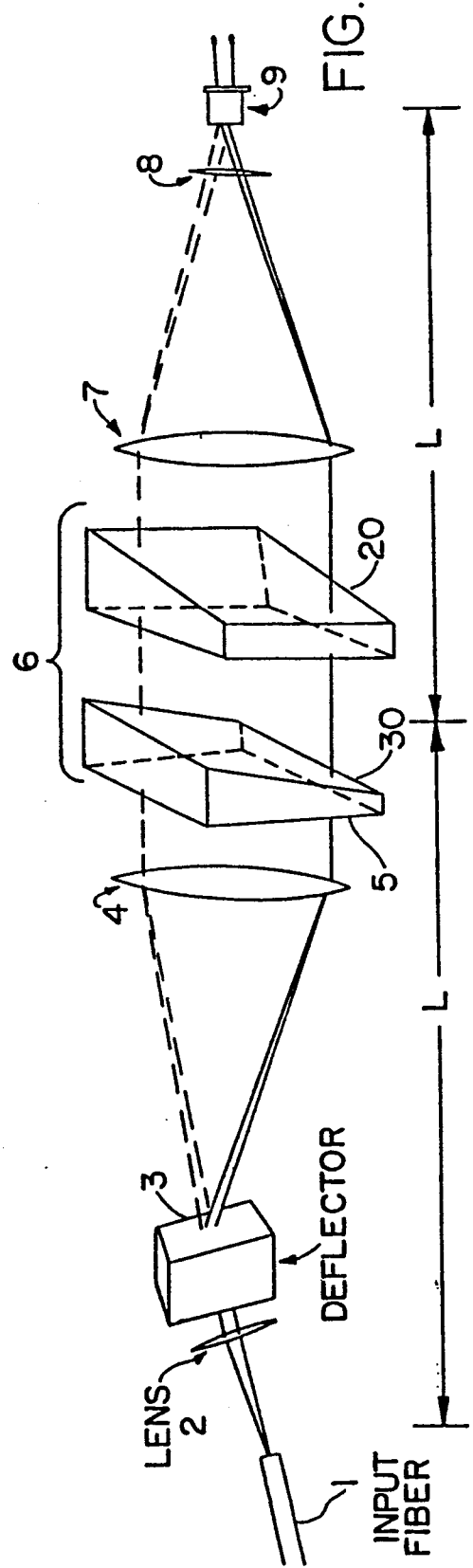
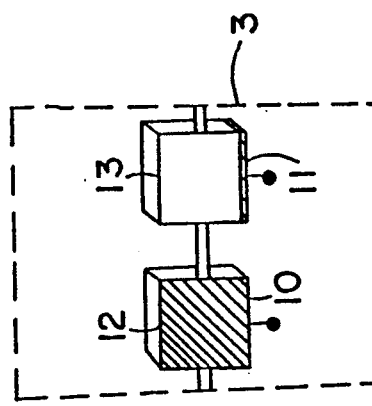

ADDRESSABLE WEDGE ETALON FILTER

DESCRIPTION OF THE INVENTION

The present invention relates to a method of narrow-band filtering of optical radiation, as used in optical communication or spectroscopy.

In particular, a simplified tunable optical filter is disclosed that uses acoustooptic deflection to address various points on a cascade of two wedge etalons (wedge Fabry-Perot interferometers).

BACKGROUND OF THE INVENTION

One of the most promising ways of improving the wavelength-discriminating ability of optical filters, i.e. increasing the finesse of the filter, has been to pass the light through a cascade of several etalons having incommensurate spacings of their transmission peaks and each having only modest finesse. To make such structures electrically tunable, it is the usual practice to provide some sort of piezoelectric structure that changes the mirror spacings by the application of one or more electrical voltages.

There are two problems with such approaches. First, the tuning speed is limited by the inertia of the physically moving parts. Second, the various parts of the assembly are subject to dimensional variations due to temperature changes and mechanical vibration, so that elaborate means must be taken to stabilize them. Although it is quite practical to make single or double-cavity etalons with a finesse of several thousand, as would be required for a wavelength-division communication network of, say, one thousand stations, the limitations on tuning speed and stability remain a serious problem with this class of solutions.

It is well known in the current art of tunable multi-cavity etalons that if a solid wedge of glass with reflective surfaces has a gradual enough taper, one can form a tunable etalon by controlling the position along the taper at which the light passes through the wedge.

Single- and multi-cavity etalons are described in the book The Fabry-Perot Interferometer, by J. M. Vaughan, published by the American Institute of Physics and herein incorporated by reference for its teachings in the field of optics. The use of separately tuned two-cavity etalons in optical communication applications is described in the paper by I. Kaminow, P. P. Iannone, J. Stone and L. W. Stulz, A Tunable Vernier Fiber Fabry-Perot Filter for FDM Demultiplexing and Detection, IEEE Photonics Tech. Ltrs., Vol 1, No. 1, January 1989, pp. 24–25, herein incorporated by reference for its teachings in the field of optics.

The use of wedges goes all the way back to Fizeau (see Born and Wolf, Principles of Optics, Pergamon Press, 6th Edition, p. 289-290). However, if the two surfaces of the wedge have only low reflectivity, interference takes place between only two weakly reflected beams of light, one from the near surface and one from the far surface. In a true wedge etalon, both facing surfaces of the wedge are reflective-coated so that the light makes many bounces, as in any Fabry-Perot interferometer. The use of wedge etalons as optically tunable devices has been described in the book by S. Tolansky, An Introduction to Interferometry, Longmans, Green and Co., 1955, and by N. Barakat, M. Medhat, H. A. El-Hennawi and S. Y. El-Zaiat in Methods of Controlling the Spatial Frequency of the Fringes Formed by a Wedge Interferometer, Optik, Vol. 81, No. 1, 1988, pp. 1-5, herein incorporated by reference for its teachings in the field of optics.

Acoustooptic deflectors, in which a high-frequency acoustic wave effectively sets up a grating in a crystal, have been used for steering laser beams since the mid-1960s. It is clear that such a deflector followed by a pinhole passing only one diffracted angle of light could be used for a crude tunable optical filter, but the number of resolvable wavelengths for such a scheme is quite small. Comprehensive discussions of acoustooptic deflectors and filters have been given by A. Korpel in "Acoustooptics—A Review of Fundamentals", Proc. IEEE, Vol. 69, No.1, January 1981, pp. 48-53, and by I. C. Chang in "Acoustooptic Devices and Applications", IEEE Transactions on Sonics and Ultrasonics, Vol. 23, No. 1, January, 1976, pp. 1-22, herein incorporated by reference for its teachings in the field of optics.

Thus, numerous references disclose the use of single-cavity etalons or acoustooptic deflectors alone to build tunable optical filters. In addition, several references have combined these two technologies (K. Liu and F. Tong, Acousto-optically Tuned Angle Etalon, IBM Tech. Disclosure Bull., Vol. 32, No. 10B, March, 1990, p. 441, herein incorporated by reference for its teachings in the field of optics; U.S. Pat. No. 4,204,771 to Shull et al.). In these references, a deflector, which precedes a single plane-parallel etalon, is used simply to change the angle at which the light passes through the etalon, thus changing slightly the resonance wavelength. The tuning range is very small as a result of the etalon being plane-parallel rather than wedge shaped.

U.S. Pat. No. 3,914,055 to Wolga et al. teaches a combination of an acoustooptic filter (as opposed to a deflector) and an etalon. The filter does rough filtering and the etalon does fine filtering.

Deflection, followed by a single wedge, is described in the paper by W. Baer and A. Gardner, "A Scanning Fabry-Perot Interferometer", Journal of the Optical Society of America, Vol. 51, pp. 1400-1401. However, this device lacks speed and selectivity because the deflection is mechanical and only a single wedge etalon is used.

SUMMARY OF THE INVENTION

In the present invention, a method and apparatus are set forth for achieving wavelength selection. Furthermore, the invention achieves very high wavelength resolution, stable operation and rapid retuning. These objectives are realized by first acoustooptically deflecting the bundle of multi-wavelength light entering the device onto a plane normal to the beam. This is done by driving two orthogonal acoustic transducers of the deflector with two suitable frequencies fx and fy. The light so deflected then passes first through a wedge etalon whose taper is along the Y-axis and then through one whose taper is along the X-axis. The pair of wedges forms two, single-cavity etalons. Depending on the choice of fx and fy any wavelength within the wavelength range covered by the two single-cavity etalons can be selected rapidly and accurately.

BRIEF DESCRIPTION OF THE DRAWINGS

FIGS. 1 and 1A are perspective drawings of an exemplary embodiment of the disclosed invention.

DETAILED DESCRIPTION OF THE INVENTION

Overview

Figure 2:
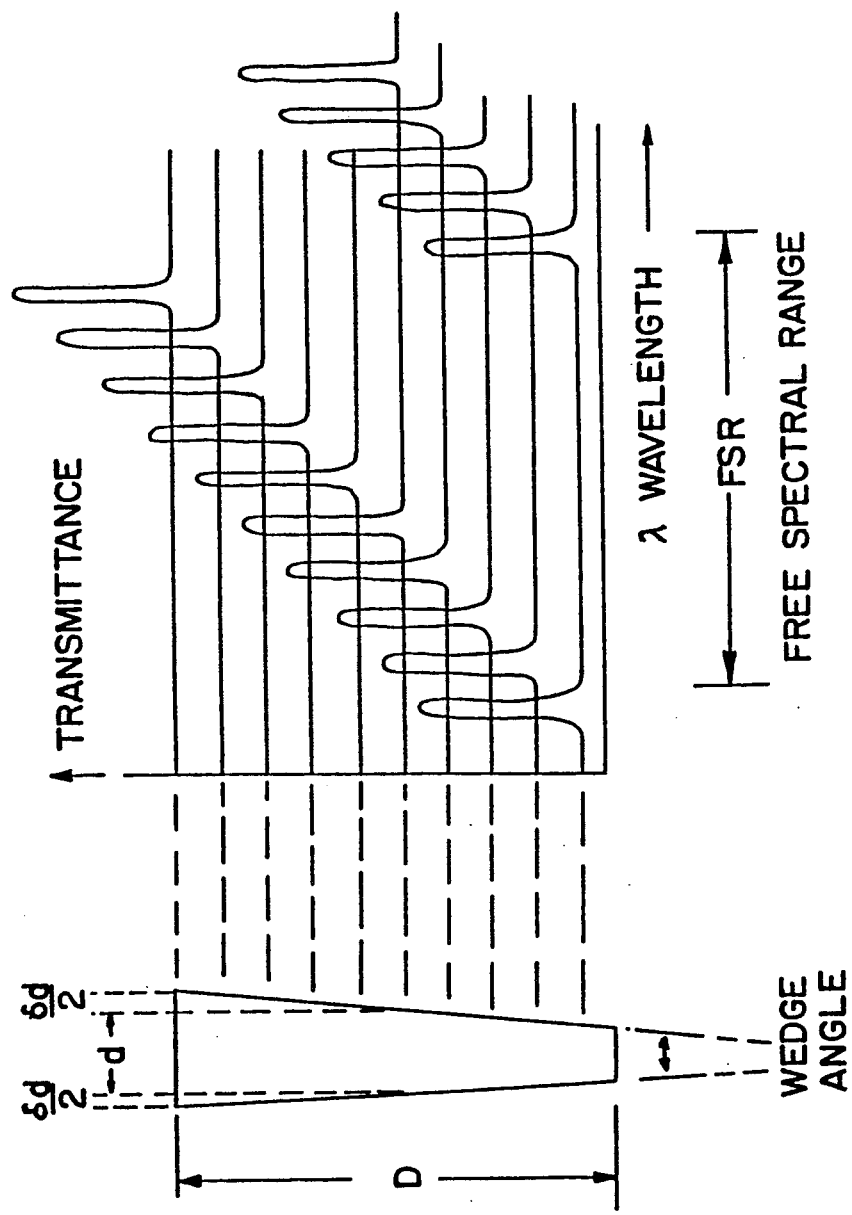
FIG. 2 is a side plan view of a wedge etalon and a graph of transmittance versus wavelength which illustrates the linear shift in the peak of the transmission wavelength across the width of the etalon.

The present invention is a tunable optical filter based upon the combination of an acousto-optical (AO) deflector and one or more cascaded wedge etalons. The AO deflector is responsive to horizontal and vertical deflection signals and includes a crystal which allows for quick interaction between the optical and acoustic waves. Thus, the AO deflector has a very fast tuning speed. In addition, two wedge etalons are cascaded for use in the present invention. An incoming beam from a fiber is deflected by the crystal to a selected location on the first wedge etalon. From there, the beam travels to a particular point on the second wedge etalon. By orienting the wedge etalons along different axes, highly selective filtering is achieved based upon the optical properties of the wedge etalons at the selected locations. Detailed Description of the Exemplary Embodiments FIG. 1 shows a tunable filter in accordance with an exemplary embodiment of the invention. Light from an input fiber 1 is focused by lens 2 so as to arrive as a small spot on the front surface of double wedge assembly 6. Before reaching the double wedge assembly, the light first passes through deflector 3. As shown in FIG. 1A, this deflector may include a first Acousto-Optical Deflector 12 for deflection in the X direction, and a second Acousto-Optical Deflector 13 for deflection in the Y direction. The acoustic wave travelling in the X-direction sets up a grating of compressions and rarefactions in the acoustooptic deflector 12, which grating acts to deflect the incident beam at an angle that depends on the wavelength of the light and the acoustic wavelength in the medium. Analogous deflection occurs in the other crystal in the Y-direction in the acoustooptic deflector 13. The light is then collimated by lens 4 so that it arrives perpendicular to front surface 5 of double wedge assembly 6. This double wedge passes only a narrow band of frequencies around the wavelength determined by the thickness of the two etalons at the coordinates X and Y, so that, if the spot contains any light at or near that wavelength, it will pass through double wedge assembly 6 and be deflected by collimating lens 7 and output focusing lens 8 onto photodetector 9. The particular value of the wavelength representing the center of the passband of the filter is varied (tuned) by changing the X and Y positions of the spot. These positions are changed by changing the two frequencies fx and fy, respectively driving the Acousto-Optical Deflectors 12 and 13. Since the neighboring spots are separated by two or more times the beam width to reduce crosstalk, the spots form a matrix on the wedge etalon assembly.

A tunable filter made in this way has several desirable properties. Acoustooptic deflectors have demonstrated the ability to provide many (up to several thousand) spots along each axis, so that in principle the use of two-dimensional deflection should have the potential to discriminate a very large number of wavelength channels.

The speed of tuning of such a filter from one optical wavelength to another, compared with other forms of tunable filters, is limited not by mechanical inertia but by the transit time of the acoustic wavefront sideways across the light beam within the acoustooptic crystal. This transit time has been observed to be from several tens of nanoseconds to several microseconds, depending on crystal material and optical beam diameter.

The exemplary Acousto-Optical Deflectors 12 and 13 consist of respective piezoelectric transducers 10 and 11 attached to the acoustooptical material. Each piezoelectric transducer is driven by an external RF signal. The deflection angle versus RF frequency does not exhibit hysteresis as compared piezoelectric positioned tunable filter. In addition, the frequencies of the X and Y acoustooptic drive signals can be derived from stable sources, e.g. by digital frequency synthesizers locked to quartz crystal oscillators. The addressable wedge etalon filter is capable of improved stability compared to previous designs. The glass material of the wedge and the crystal within the deflector are more temperature stable than piezoelectric structures, for example.

In an alternative embodiment of the disclosed invention, an electrooptical deflector may be used as the deflector 3 for directing the beam of light.

In another alternative embodiment of the disclosed invention, micro mirror devices (causing mechanical deflection) may be used for the deflector 3. The use of such devices is discussed in Rich Malloy, TI's New Printer Technology Does It with Mirrors, BYTE, November 1990, pp 2-3 and R. Mark Boysel, James M. Florence, and Wen-Rong Wu. Deformable Mirror Light Modulators for Image Processing, SPIE Vo. 1151, Optical Information Processing Systems and Architectures (1989) pp. 183-193.

The important parameter of the acoustoptical device is the number of resolvable spots on each axis N, given by equation (1):

$$N = \tau \delta f \quad (1)$$

where $\tau$ is transit time of the acoustic wave across the width of the optical beam, and $\delta f$ is the difference in applied frequency for a minimum and maximum deflection. The transit time $\tau$ fundamentally links the channel access time and N together; large N requires a slow access time and vice versa. RF signals are applied to two orthogonal axes of the crystal (x-y deflection); both axes are near perpendicular to the direction of the incoming beam. The angle of deflection inside the crystal, $\delta\Theta$ for a single axis is given by equation (2):

$$\delta\Theta = \frac{\delta f \lambda}{n v_s} \quad (2)$$

where $\lambda$ is the optical wavelength, n is the optical index and $v_s$ is the velocity of sound in the crystal.

Relevant characteristics for appropriate materials include commercial availability, transparency, minimal RF power requirements in order to deflect a beam, a high number of resolvable spots and a low RF attenuation. In an exemplary embodiment of the invention, TeO$_2$ crystals may be used for the acoustooptic transducers 10 and 11. Relevant acoustooptical properties of TeO$_2$ are listed in Table I.

TABLE I

| wavelength range | 0.35–4 μm |
|---|---|
| velocity of sound | 0.616 × 10$^5$ cm/sec |
| attenuation RF | 220 dB/cm GHz$^2$ |
| optical index | 2.26 at λ = 0.633 μm |

Using operating conditions of $\delta f = 10$ MHz and a beam diameter in the crystal of $w = 2$ mm, the attenuation in the acoustic wave across is estimated at 0.8 dB/cm, the transit time $\tau = 3$ μ sec, the angle of deflection $n\delta\Theta = 3°$, and the number of resolvable spots $N = 30$. The separation between channels must be greater than the separation between resolvable spots in order to reduce crosstalk. By using a spacing between adjacent channels of 2 times the beam width, a total of channels $M = 100$ (from $10 \times 10$) is available using x-y deflection.

To a first approximation, in which the wedge angle is small, an etalon operates with Free Spectral Range (FSR) given by equation (3):

$$FSR = \delta\lambda = \frac{\lambda^2}{2dn} \quad (3)$$

where n is the optical index and d is the etalon thickness. The wedge angle provides a linear shift in the peak of the transmission wavelength across the dimension width D of the etalon. The total shift covers the entire FSR when the total difference in thickness (due to the wedge) is $\delta d = \lambda/2n$. The wavelength selection is then provided by the position of the beam on the edge etalon. This is depicted in FIG. 2.

Figure 3:
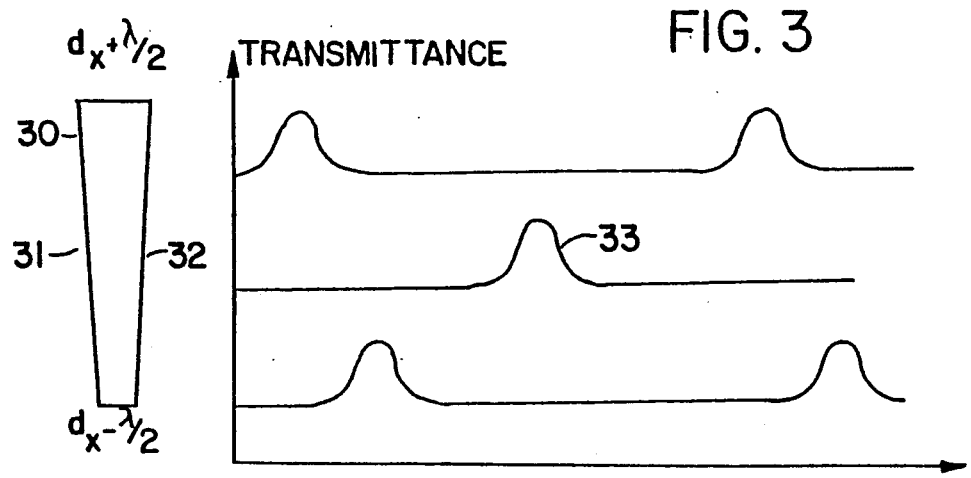
FIG. 3 is a side plan view of a wedge etalon and a graph of transmittance versus wavelength which shows how the first wedge passes only certain wavelength regions, depending on the position Y along the taper.

FIG. 3 shows how wedge etalon 30 operates to have a resonant passband peak at wavelengths. In accordance with the figure, thickness ($d_y$) at the point where the light is incident is given by equation (4):

$$d_y = i\lambda/2n \quad (4)$$

wherein n is the refractive index of the medium (typically glass or air), and i is the order of the resonance. The bandwidth of a resonance determines selectivity. The bandwidth is equal to the FSR divided by the finesse of the etalon. The finesse depends on the reflectivity of the mirrors, wedge angle and beam width. The spectral peaks in the passband of wedge 30 will be separated by the free spectral range, given by equation 5:

$$FSR_Y = \frac{\lambda^2}{2d_y n} = \lambda/i \quad (5)$$

The wedge angle provides a linear shift in the peak of the transmission wavelength across the width D of the wedge etalon. The total shift covers the entire FSR when the total difference in thickness across the wedge is $\lambda/2n$.

It is a well known in the art that a cascade of two Fabry-Perot interferometers will have greater selectivity than each individually. If a second cavity, such as the second wedge 20 shown in FIG. 1, is cascaded with the first, so that the incident light has to traverse cavity 30 and then cavity 20, and if the mirror spacing $d_y$ of wedge 30 resonating with λ is different from $d_x$ of wedge 20, namely $d_y = i\lambda/2n$, then its free spectral range is given by equation (6)

$$FSR_X = \frac{\lambda^2}{2d_x n} = \lambda/j \quad (6)$$

Thus, the transmission spectrum of wedge 20 is a comb response, having teeth spaced $\lambda/j$ apart and similarly $\lambda/i$ apart for wedge 30. By picking i and j to be different integers, one can assure that full transmission through both cavities will occur only for teeth that are relatively far apart, thus creating a very high effective FSR.

Figure 4:
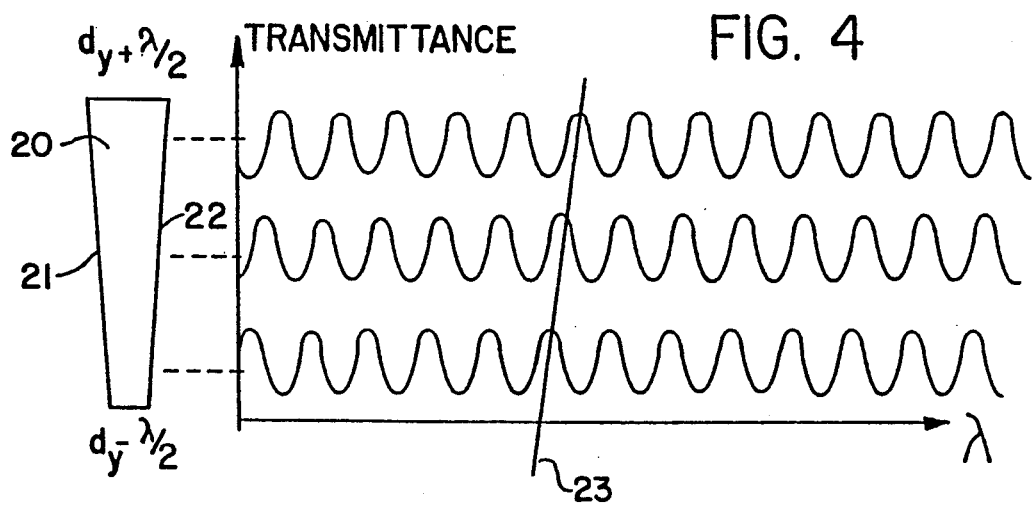
FIG. 4 is a side plan view of a wedge etalon and a graph of transmittance versus wavelength which shows how the second wedge passes only certain wavelength regions, depending on the position X along the taper.

As FIGS. 3 and 4 show, the first wedge 30 can be made thick, so that FSR$_Y$ is small, and wedge 20 can be made thin, so that FSR$_X$ is large. If a typical response peak 33 of wedge 30 can be made sufficiently narrow that only a single peak 23 of wedge 20 is passed, then in order to tune across the entire FSR$_X$ of the second cavity 20, while preserving the wavelength resolution of the first cavity 30, it is only necessary to deflect the spot in the pattern shown in FIG. 5.

In an exemplary embodiment of the disclosed invention, wedge assembly 6 consists of wedge 30 cascaded with respect to wedge 20, with their tapers oriented in the Y- and X- directions, respectively. Alternatively, the tapers of wedge 30 and 20 may be oriented in the X- and Y- directions, respectively. In the exemplary embodiment of the disclosed invention, the direction of maximum increase in thickness of the first etalon is approximately orthogonal to the direction of maximum increase in thickness of the second etalon. In a preferred embodiment of the present invention, the first wedge is rotated by an angle α with respect to the second wedge to maximize the transmission of the subsequent rows of deflected spots on the etalon assembly. The angle α is given by equation (7):

$$\alpha = \sin^{-1}(1/M^{\frac{1}{2}}) \quad (7)$$

where M is the number of channels. The rotation of the first etalon is desirable in order to align transmission peaks such that maximum throughput can be obtained.

Figure 5:
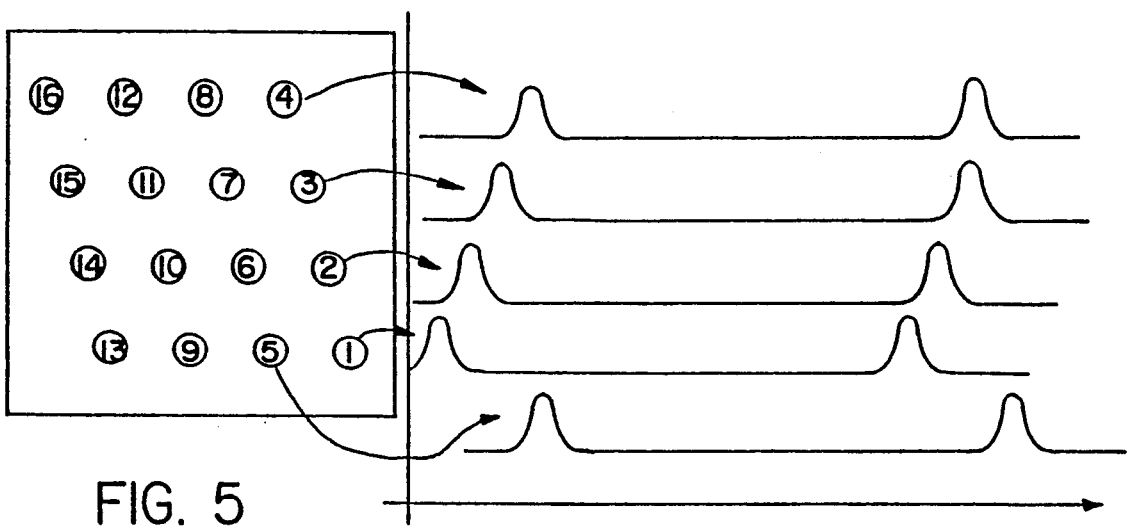
FIG. 5 is a front plan view of a wedge etalon and a graph of transmittance versus wavelength which shows how the combination of two wedges pass only one wavelength region, depending on the X-Y position.

Similar effect can be achieved by slightly displacing the subsequent row of incident spots on the etalons in a perfectly orthogonal wedge etalons, as shown in FIG. 5. This displacement can be controlled, again, digitally by the frequency synthesizers, for example.

While in the preferred embodiment of the present invention, the orientation of the two wedge etalons is approximately orthogonal, the direction of maximum increase in thickness of the first etalon may be in any orientation relative to the direction of maximum increase in thickness of the second etalon, so long as the respective directions of maximum increase in thickness of the two etalons are not parallel.

The Fabry-Perot interferometer will not function as expected when the wedge angle causes the lateral displacement of the beam to exceed the beam spot size. More importantly, the performance is limited by beam diffraction inside the wedge etalon. In order to maintain the similar spot size while propagating through the cascaded etalons, the beam spot size is limited to about 170 μm for a Fabry-Perot interferometer with d = 300 μm and finesse of 100, for example. With the consideration of crosstalk from neighboring spots, the wedge etalon dimension is at least of ¼" in width, using a separation between channels be two times the beam width as criterion.

The separation of the etalons may be small compared to L, the distance from the deflector to the etalon.

As seen in equation (2) the AO deflector causes longer wavelengths to be deflected slightly more than shorter wavelengths. For an exemplary range of wavelengths (1520 nm to 1550 nm), this effect translates to an extra 0.04° deflection angle, compared to 3.0° total deflection range due to the RF alone. Due to the multiple wavelengths present in the beam, the longer wavelengths are deflected farther away from the normal than the shorter ones. As shown in FIG. 4, by proper orientation of each wedge etalon (wedge thickness increasing in direction of minimum deflection), this effect can improve the system performance. Wavelengths, other than the selected one, now fall upon the wedge at locations even further from resonance, thus enhancing the selectivity.

The total optical throughput of the exemplary embodiment of the invention is estimated to be about 10%, using the following estimations: deflection efficiency for the combined axis 20%, transmission of lenses 90%, throughput of etalon assembly 50%. The reflection of the rejected waves from the etalons will largely miss the fiber carrying the incoming waves by diffraction and impose very little feedback to the transmitting lasers. The combination of fast channel access time and large number of channels is superior to other available tunable filters. However, the possible drawback is the size of the assembly which is dictated by the focusing spot size as limited by diffraction at the wedge etalon assembly and maximum deflection angle. One possible means to reduce the physical size would be the use of high index dielectric thin films (not shown) which act as etalons. This could be achieved by tailoring the thickness of the thin film of high optical index across a substrate. The separation between the wedge etalons formed by these films can be greatly reduced, making spot size easier to control. Dielectric thin films can be made by standard film deposition techniques which are well known in the art of optics.

FIG. 5 shows a head-on view of the front surface (5 in FIG. 1) of the double wedge, with the numbered circles indicating wavelength channels of increasing wavelength. One of these channels can be selected by deflecting the light on that spot position. Typically, one peak of the thinner wedge 20 (such as 23 in FIG. 4) selects out only one narrow peak (such as 33 in FIG. 3).

While the invention has been described in terms of an exemplary embodiment, it is contemplated that it may be practiced as outlined above with modifications within the spirit and scope of the appended claims.

What is Claimed:

1. An optical filter, comprising:
   (a) a wedge etalon; and
   (b) acoustooptical deflector means for directing an incident beam of light to said wedge etalon.

2. An optical filter, comprising:
   (a) a first wedge etalon having a direction of maximum increase in thickness; and
   (b) a second wedge etalon having a direction of maximum increase in thickness, cascaded with respect to the first wedge etalon and oriented such that the direction of maximum increase in thickness of the second wedge etalon is not parallel to the direction of maximum increase in thickness of said first wedge etalon.

3. The optical filter of claim 2, wherein the direction of maximum increase in thickness of the first wedge etalon is approximately orthogonal to the direction of maximum increase in thickness of the second wedge etalon.

4. Apparatus employing the optical filter of claim 2 to discriminate M wavelength channels wherein the direction of maximum increase in thickness of the first wedge etalon forms an angle $\alpha$ with respect to the direction of maximum increase in thickness of the second wedge etalon and the angle $\alpha$ is defined by the equation $\alpha = -\sin^{-1}(1/M^{\frac{1}{2}})$.

5. An optical filter, comprising:
   (a) a first wedge etalon having a direction of maximum increase in thickness;
   (b) directing means for directing an incident beam of light to the first wedge etalon; and
   (c) a second wedge etalon having a direction of maximum increase in thickness, cascaded with respect to the first wedge etalon and oriented such that the direction of maximum increase in thickness of the second wedge etalon is not parallel to the direction of maximum increase in thickness of the first wedge etalon.

6. The optical filter of claim 5, wherein the direction of maximum increase in thickness of the first wedge etalon is approximately orthogonal to the direction of maximum increase in thickness of said second wedge etalon.

7. Apparatus employing the optical filter of claim 5 to discriminate M wavelength channels wherein the direction of maximum increase in thickness of the first wedge etalon forms an angle $\alpha$ with respect to the direction of maximum increase in thickness of the second wedge etalon and the angle $\alpha$ is defined by the equation $\alpha = -\sin^{-1}(1/M^{\frac{1}{2}})$.

8. The optical filter of claim 5, wherein the directing means includes an acoustooptical deflector.

9. The optical filter of claim 5, wherein the directing means includes an electro-optical deflector.

10. The optical filter of claim 5, wherein the directing means includes a micro mirror device.

11. The optical filter of claim 5, wherein the first wedge etalon has a front surface and wherein the directing means includes means for directing the incident beam of light onto a plurality of distinct locations on the front surface of the first wedge etalon.

12. The optical filter of claim 11 wherein the plurality of distinct locations are arranged in a matrix.

* * * * *